United States Patent [19]

Richter et al.

[11] Patent Number: 5,086,929
[45] Date of Patent: Feb. 11, 1992

[54] SORTING APPARATUS AND METHOD

[75] Inventors: Robert A. Richter, Deerfield; Maurice C. Rochman, Plantation; Stephen M. Gordon, Hallandale, all of Fla.

[73] Assignee: G B Instruments, Inc., Hollywood, Fla.

[21] Appl. No.: 482,182

[22] Filed: Feb. 20, 1990

[51] Int. Cl.5 .......................... B07C 1/00; B07C 5/36
[52] U.S. Cl. ........................ 209/698; 198/365; 209/900
[58] Field of Search .............. 209/698, 900, 569, 583, 209/584, 655; 198/365, 704

[56] References Cited

U.S. PATENT DOCUMENTS

| | | |
|---|---|---|
| 904,680 | 11/1908 | Burrows . |
| 2,387,457 | 10/1945 | McIlwrick . |
| 2,626,828 | 1/1953 | Morgan . |
| 2,689,657 | 9/1954 | Lens .................... 198/365 |
| 2,732,163 | 1/1956 | Senzani . |
| 2,993,724 | 7/1961 | Pakulla . |
| 3,167,192 | 1/1965 | Harrison et al. . |
| 3,269,520 | 8/1966 | Bishor et al. . |
| 3,348,359 | 10/1967 | Lasbrey . |
| 3,463,298 | 8/1969 | Harrison . |
| 3,524,005 | 8/1970 | Scott . |
| 3,757,939 | 9/1973 | Henig . |
| 3,782,541 | 1/1974 | Wood . |
| 3,884,370 | 5/1975 | Bradshaw et al. . |
| 3,974,909 | 8/1976 | Johnson . |
| 4,008,813 | 2/1977 | Leersnijder . |
| 4,089,404 | 5/1978 | Venzke ................ 198/365 |
| 4,183,707 | 1/1980 | D'Aloia ............. 209/900 X |
| 4,310,276 | 1/1982 | Castagnoli ........ 209/900 X |
| 4,375,256 | 3/1983 | Selleri .................... 190/360 |
| 4,509,635 | 4/1985 | Emsley et al. ........ 198/365 |
| 4,567,988 | 2/1986 | Weibel .................. 209/564 |
| 4,688,678 | 8/1987 | Zue et al. ............. 209/552 |
| 4,895,242 | 1/1990 | Michel ................. 198/565 |

FOREIGN PATENT DOCUMENTS

| | | |
|---|---|---|
| 894172 | 10/1952 | Fed. Rep. of Germany . |
| 2615419 | 11/1988 | France .................. 209/900 |
| 18951 | 9/1928 | Netherlands . |
| 1040915 | 9/1966 | United Kingdom . |

Primary Examiner—Donald T. Hajec
Attorney, Agent, or Firm—Polster, Lieder, Woodruff and Lucchesi

[57] ABSTRACT

A sorter (3) is disclosed in which an article (A) to be sorted is delivered to a carrier. The carrier is moved by a conveyor drive along a path to a selected one unloading station UL at which two or more receptacles or bags (3) are located and the article is unloaded (dropped) from its carrier into its predetermined receptacle. After an article is loaded into the carrier, the carrier is inclined in one direction or the other and is conveyed to its selected one unloading station such that the carrier is in position to deliver its article to the proper receptacle. At each turn of the conveyor, the carriers inclined toward the inside of the turn may, optionally, be moved back toward their centered (vertical) positions as they are moved into and through the turn thereby to prevent interference between the carriers. A method of sorting is also disclosed.

40 Claims, 9 Drawing Sheets

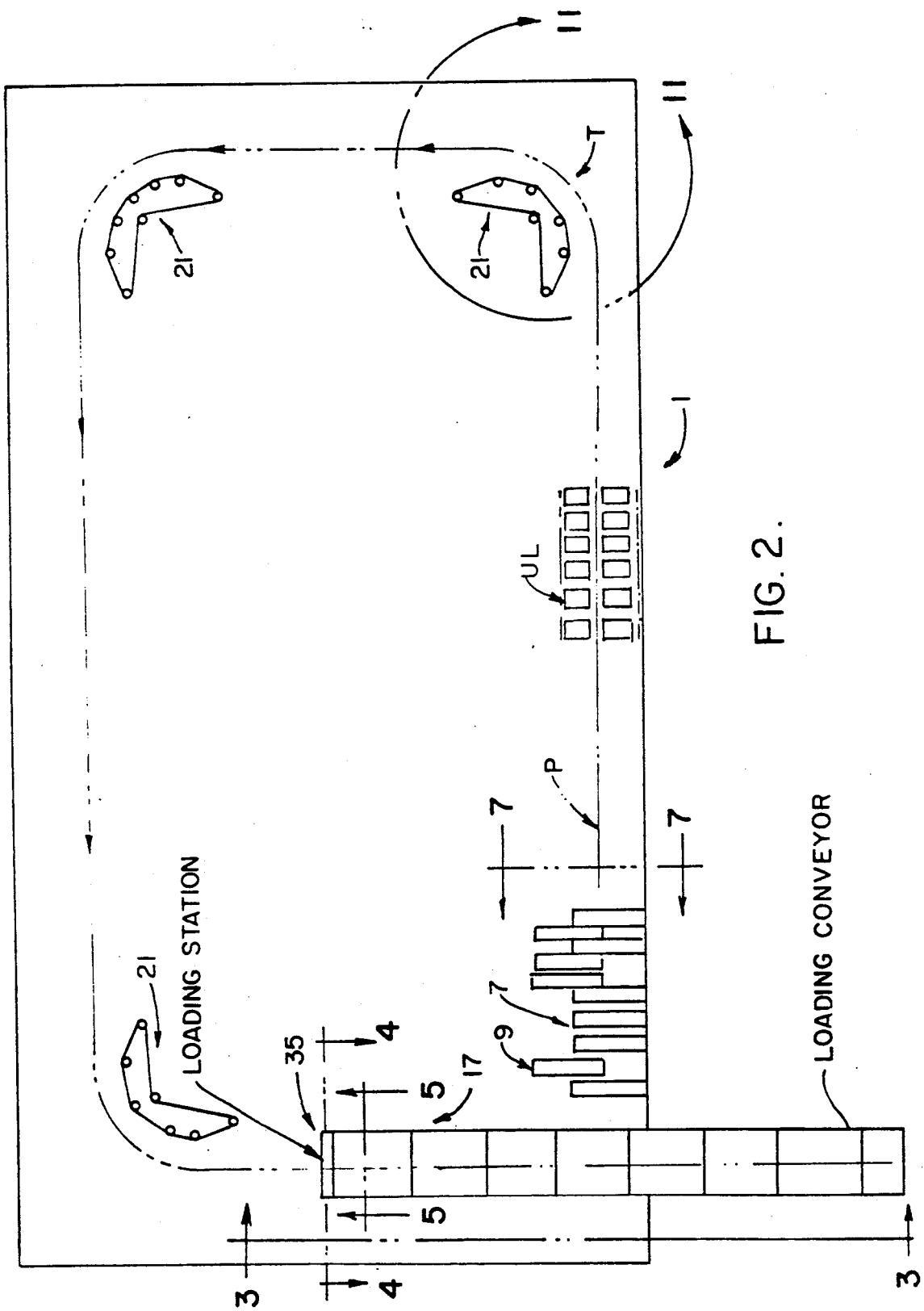

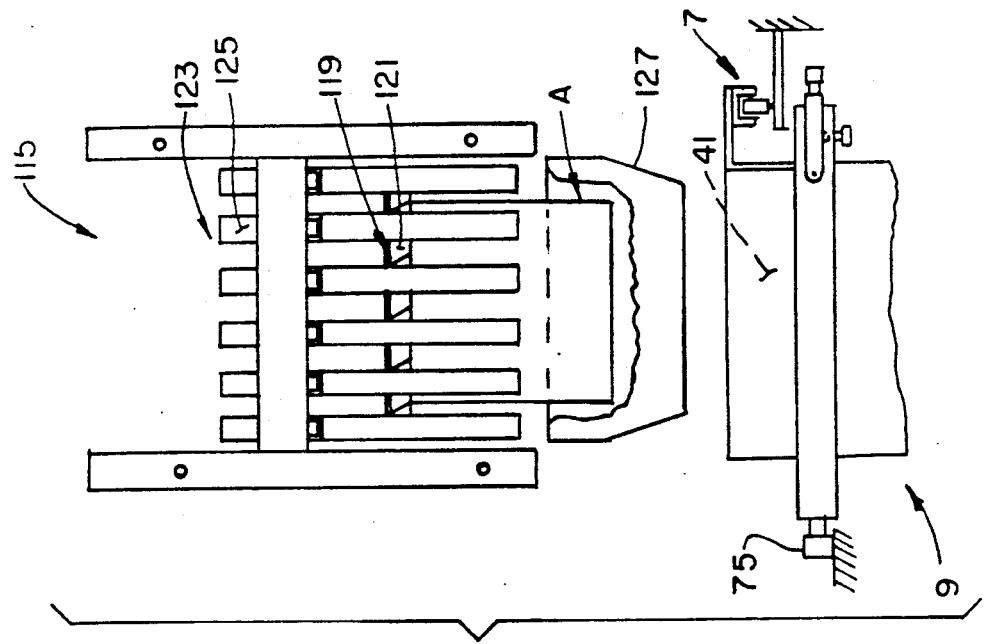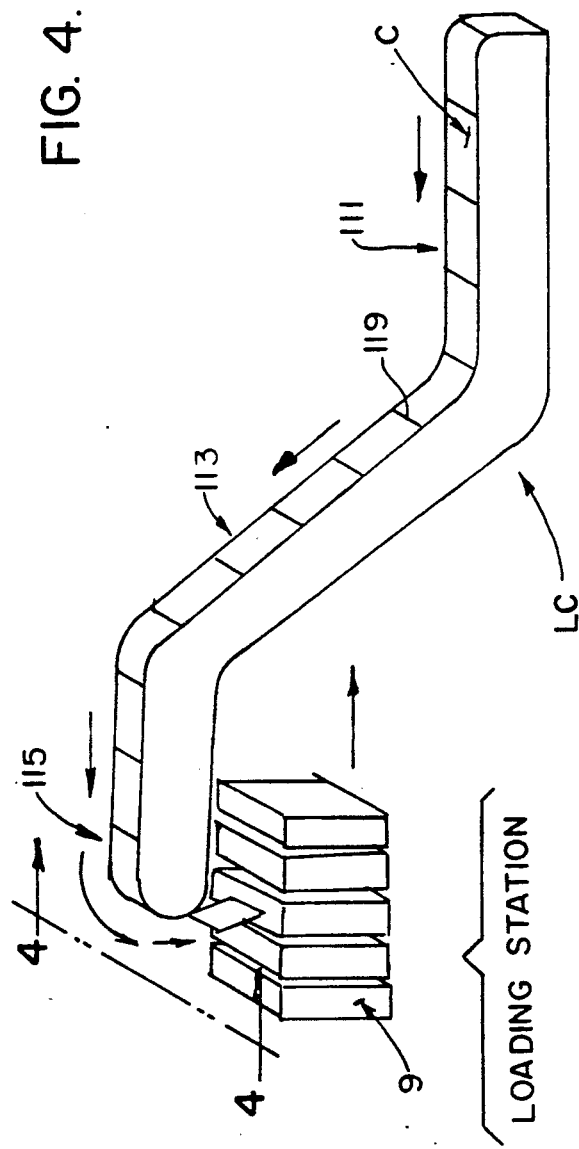
FIG. 4.
FIG. 3.

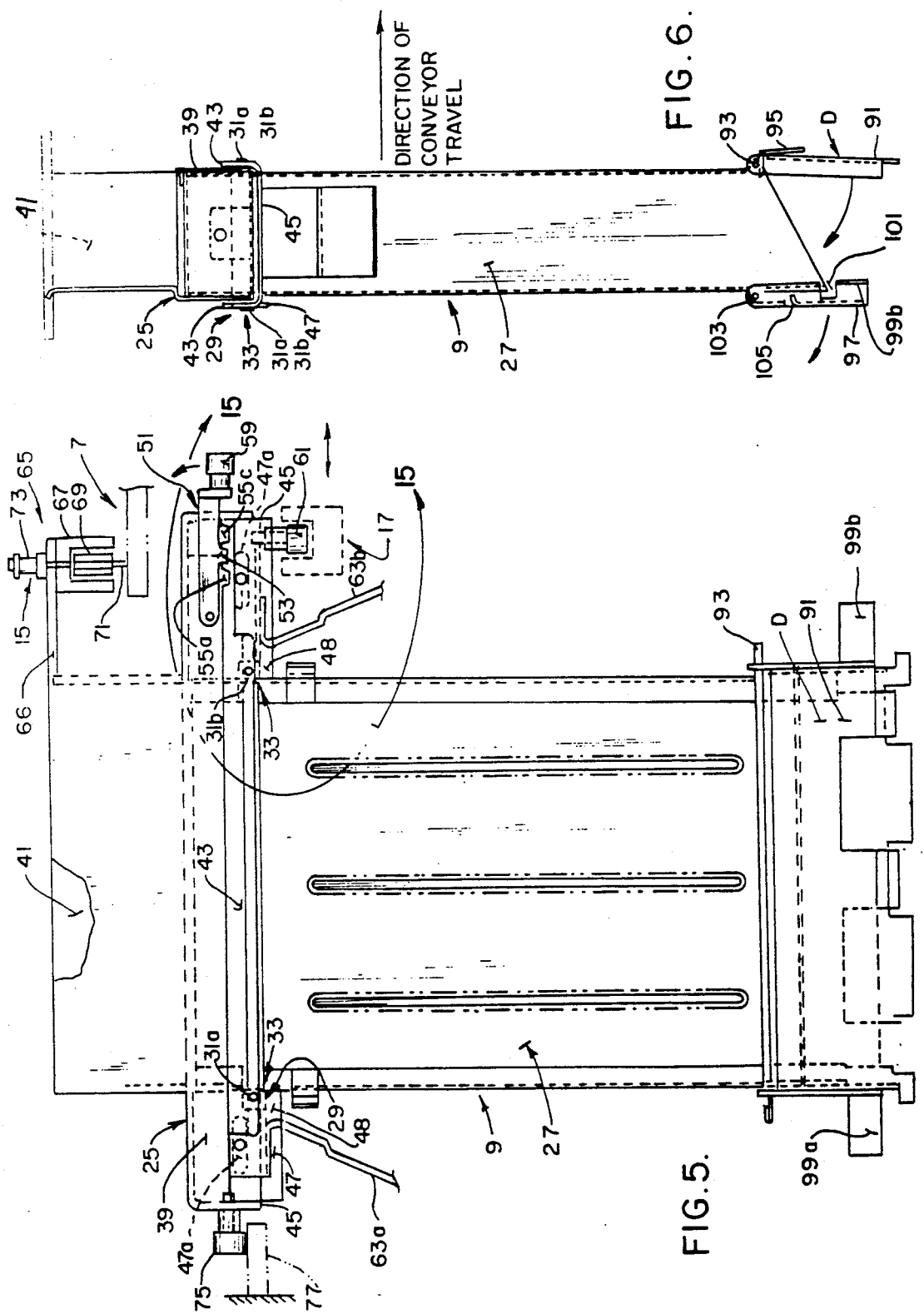

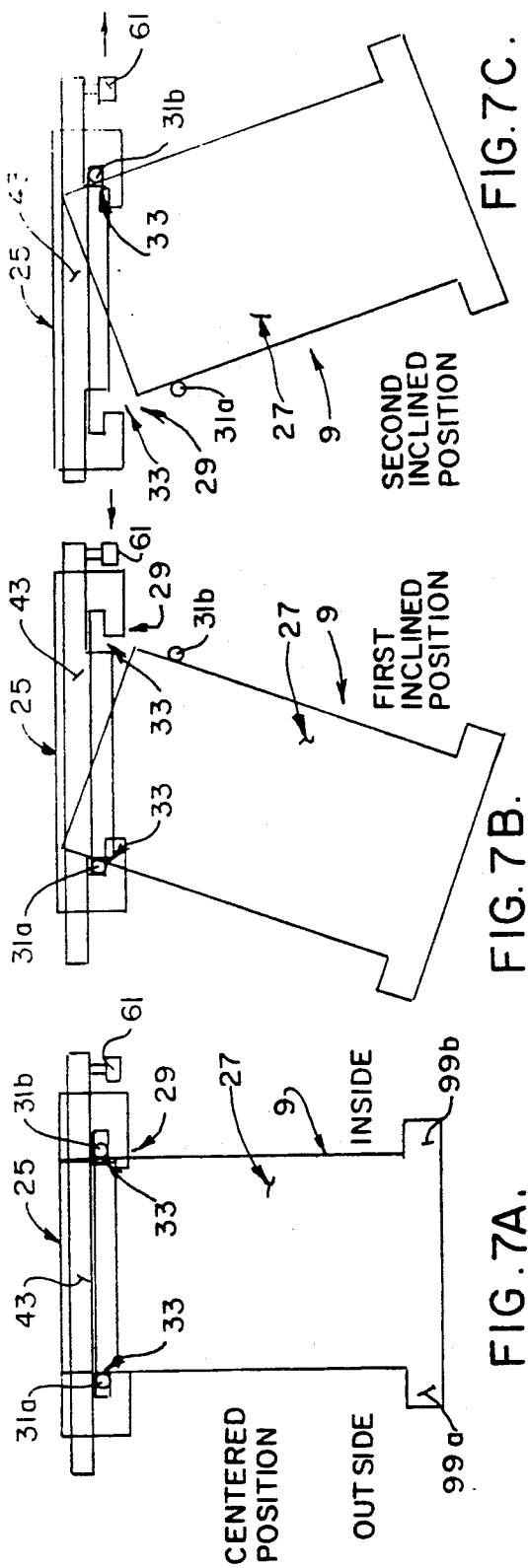
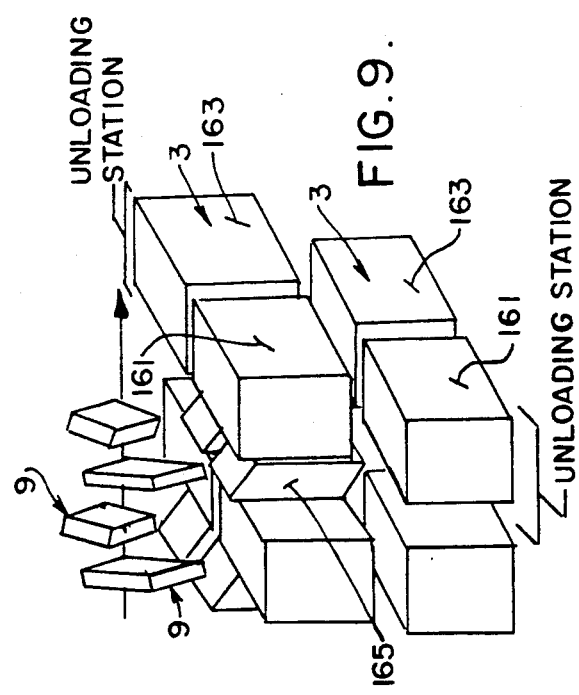
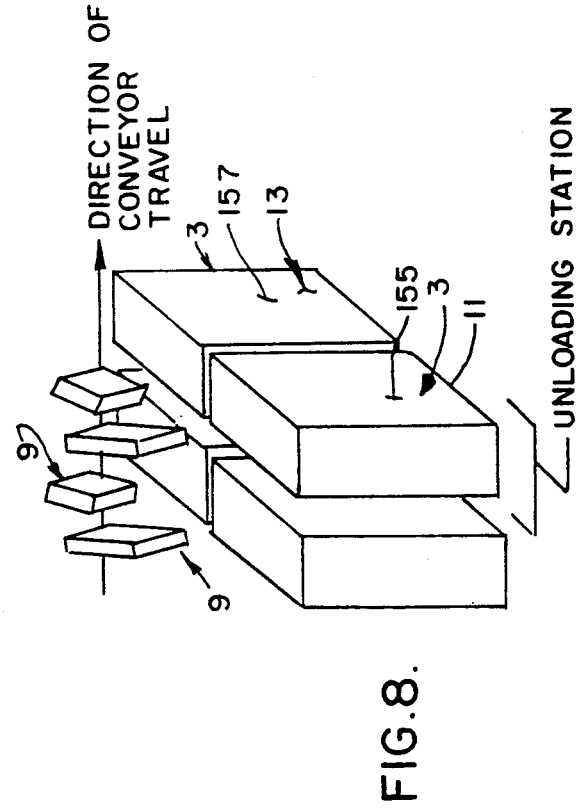

SORTING APPARATUS AND METHOD

BACKGROUND OF THE INVENTION

This invention relates to apparatus for and a method of sorting articles into a selected one of a multiplicity of receptacles. More particularly, this invention relates to apparatus for sorting packages, mail, or other articles into bags or other containers for delivery to specified locations.

Heretofore, sorting apparatus was known which sorted articles into receptacles. Such apparatus typically included a conveyor moveable along a path having a multiplicity of trays or carriers for holding one of the articles to be sorted as the conveyor moved along its path. A loader was provided to load the articles onto the trays, usually one article to a tray. A number of receptacles were located along the path of the conveyor and means was provided for dumping or otherwise unloading an article from its tray as the tray is moved along the conveyor path so as to deliver the article to a specified receptacle. Reference may be made to such U.S. Pat. Nos. as 4,567,988 and 4,688,678, and 4,895,242, and to Dutch patent 18,951 which illustrate prior art sorting machines in the same general field as the present invention.

However, as a general goal with such sorting equipment, it is highly desirable to make the sorter as "dense" as possible. That is, that the sorter have as many article receiving receptacles as possible in as small a space as possible. It is also desirable that the sorter have as high a throughput as possible thereby to enable it to sort as many articles as possible in a given time.

Toward that end, many of the prior art sorters have been designed to have multiple receptacles at each unloading station along the path of the conveyor so that at each unloading station, the article carried by a tray or carrier on the conveyor may be selectively unloaded into any one of the receptacles at any one of the unloading stations. However, this required the provision of means at each of the unloading stations responsive to a control system for effecting the release of the article from the carrier in a predetermined manner so as to direct the article into the selected one of the receptacles at that one unloading station. As shown in the co-assigned U.S. Pat. No. 4,895,242, each of the carriers was provided with a plurality of latches and cams for controlling the position of spring loaded gates on the carrier. With these gates in a first or closed position, the article was held within the carrier, with the gates in a second position the article was permitted to fall into a first receptacle, with the gates in a third position the article was permitted to fall into a second receptacle, and with the gates in a fourth position the article was permitted to fall into a third receptacle. However, the requirement of the complicated gates on each carrier, and the requirement of cams and cam actuating means at each of the unloading for stations selectively operating the gates increased the complexity and cost of this prior art sorter.

Other sorters are known, such as is shown in the co-assigned U.S. Pat. No. 4,688,678 to Zue, which utilizes horizontal carriers onto which articles are loaded. The carriers are conveyed along a path to a selected unloading station at which the article is unloaded. Each unloading station is provided with a drop chute having a plurality of diverter gates which direct an article falling downwardly within the chute into a predetermined one of the receptacles at that unloading station.

U.S. Pat. No. 4,567,988 discloses sorting apparatus in which an article to be sorted is loaded onto a carrier and the carrier is conveyed along a path to a specified unloading station. Each of the carriers is provided with a bottom release gate which when opened releases the article to fall downwardly. Along the conveyor path, chutes are provided into which the articles are dropped such that the chutes direct the article into a selected one of the receptacles.

Dutch Patent 18,951 discloses sorting apparatus in which each of the carriers is mounted on the conveyor in such manner as to be tilted to an inclined position thereby to direct the package carried thereby to be directed into a specified chute to be delivered into a selected receptacle. However, this Dutch sorter requires a complicated mechanism for moving the carrier to its desired tilted position.

SUMMARY OF THE INVENTION

Among the several objects and features of the present invention may be noted the provision of apparatus for sorting articles into a selected one of a multiplicity of article receiving receptacles with the receptacles being arranged in groups at unloading stations;

The provision of such sorting apparatus employing carriers of relatively simple construction and release means at each unloading station of simple and rugged construction;

The provision of such sorting apparatus in which the carriers may readily be predisposed in an inclined position in one direction or the other with respect to the conveyor path for delivery of the article to a selected one article receiving receptacle at a predetermined one of the unloading stations;

The provision of such sorting apparatus in which, with at least certain of the carriers inclined toward the inside of a turn of the conveyor, these certain carriers may be temporarily moved back to a centered or upright position as the carriers move through the turn so as to prevent interference between the carriers inclined toward the inside of the turn;

The provision of such apparatus which requires only a single means at one location along the conveyor path for shifting each of the carriers after a respective article has been loaded therein to its predetermined inclined position;

The provision of such sorting apparatus which employs a release means at each unloading station operable to release the article from the carrier regardless of the position of the carrier;

The provision of such sorting apparatus which has a high throughput capability (e.g., up to 6,000 or more packages/hour);

The provision of such sorting apparatus which is of compact size in relation to its throughput capability;

The provision of such sorting apparatus which is, within limits, capable of sorting wide variety of package sizes and weights;

The provision of such sorting apparatus in which the articles are force-loaded into the carriers at a loading station thereby to reduce the time to load an article into a carrier and to permit the carriers to move past the loading station at a higher speed and yet insure that the articles are reliably loaded into the specified carrier;

The provision of such sorting apparatus in which the receptacles at certain of the unloading stations are arranged to maximize the density of the receptacles at the unloading station;

The provision of such sorting apparatus which permits the ready exchange of a filled receptacle for an empty receptacle;

The provision of a method of sorting articles into a selected one of a multiplicity of article-receiving receptacles in which certain ones of the carriers for the articles are inclined to a predetermined position after an article has been loaded therein such that when the carrier reaches a predetermined unloading station the release of the article from the carrier will result in the delivery of the article into a selected one of the receptacles; and, The provision of such a method of sorting articles in which the carriers inclined toward the inside of a turn of the conveyor may optionally be moved toward a centered or vertical position with respect to the conveyor as the carrier moves into and through the turn and then is allowed to again assume its predetermined inclined position as the carrier exits the turn so as to prevent interference between adjacent carriers as they are conveyed through the turn.

Other objects and features of this invention will be in part apparent and in part pointed out to those skilled in the art.

Briefly stated, the present invention relates to apparatus for sorting articles into a selected one of a multiplicity of article-receiving receptacles. The apparatus comprises a plurality of carriers, means for conveying the carriers together with the articles received therein along a predetermined path, and a loading station along the path at which the articles to be sorted are loaded into the carriers. A plurality of unloading stations are provided along said path, with each unloading station having at least a first article-receiving receptacle on one side of the path and a second article-receiving receptacle on the other side of the path. Means is provided for supporting each of the carriers on the conveying means as the carrier is conveyed along the path in a centered position generally in line with the path, or in a first inclined position with respect to the centered position in which an article released from the carrier at a selected one of the unloading stations is delivered to the first article receiving receptacle, or in a second inclined position with respect to the centered position in which an article released from the carrier at the selected one of the unloading stations is delivered to the second receptacle. Means is provided for prepositioning each of the carriers with an article loaded therein in one or the other of its inclined positions, with the prepositioned inclined position of the carrier corresponding to a selected receptacle at a predetermined unloading station into which the article is to be delivered. Further, means is provided at the predetermined unloading station for effecting the release of the article from the selected one carrier thereby to deliver the article carried by the selected one carrier to its corresponding receptacle.

The method of this invention relates to sorting articles into a selected one of a plurality of article-receiving receptacles, the receptacles being arranged in groups along a path with each group of receptacles constituting an unloading station, and with at least one of the receptacles at each unloading station being on one side of the path and with another of the receptacles being on the other side of the path. Wherein, the method comprises the steps of, loading an article into a carrier and moving the carrier along the path with the carrier prepositioned in either a first inclined position toward the one side of the path for delivery of the article into a selected one of the receptacles on the one side of the path at a predetermined unloading station or a second inclined position toward the other side or the path for delivery of the article into a selected other of the receptacles on the other side of the path at the predetermined unloading station. Then, with the carrier in one of its inclined positions, the carrier is conveyed along the path to a predetermined unloading station. The unloading of the article from the carrier is effected at the predetermined unloading station for delivery of the article to the selected one of the receptacles corresponding to the article carried by the carrier.

BRIEF DESCRIPTION OF THE DRAWINGS

FIG. 2 is a top plan view of the sorting apparatus of the present invention illustrating certain of the main features of the sorter in diagrammatic form;

FIG. 3 is a perspective view in diagrammatic form illustrating a loading conveyor of the apparatus of the present invention for receiving articles to be sorted and for forcibly inserting the articles into carriers of a sorting conveyor at a speed faster than can be accomplished by the free fall of the articles;

FIG. 4 is a view taken along line 4—4 of FIG. 3 showing, in enlarged scale, the end of the loading conveyor as the articles are forcibly inserted into their respective carriers;

FIG. 5 is a front elevational view of a carrier in its centered or vertical position on the conveyor of the apparatus of the present invention illustrating means at the righthand side (i.e., at the inside of the carrier) for effecting prepositioning of the carrier to either a first inclined position in which the carrier is inclined toward the outside of the conveyor or to a second inclined position in which the carrier is inclined toward the inside of the conveyor, the inclined positions being shown in phantom;

FIG. 6 is a right side elevational view of the carrier shown in FIG. 5 with the bottom door or gate of the carrier in its open position and with the above-mentioned prepositioning means omitted for clarity;

FIGS. 7A–7C are diagrammatic front elevational views of a carrier showing the carrier in a vertical, centered or home position (FIG. 7A), in a first or outside inclined position (FIG. 7B), or in a second or inside inclined position (FIG. 7C);

FIG. 8 is a diagrammatic perspective view of two adjacent unloading stations each comprising a pair of so-called "high volume" article receiving receptacles on opposite sides of the path of the conveyor and illustrating the carrier in both of its inclined positions for delivery of the articles carried thereby into a selected one of the receptacles;

FIG. 9 is a view similar to FIG. 8 showing certain of the unloading stations being sized to receive a high volume of articles to be sorted and certain of the other unloading stations being configured to receive a lower volume of articles;

Corresponding reference characters indicate corresponding parts throughout the several views of the drawings.

DESCRIPTION OF THE PREFERRED EMBODIMENTS

Figure 1:
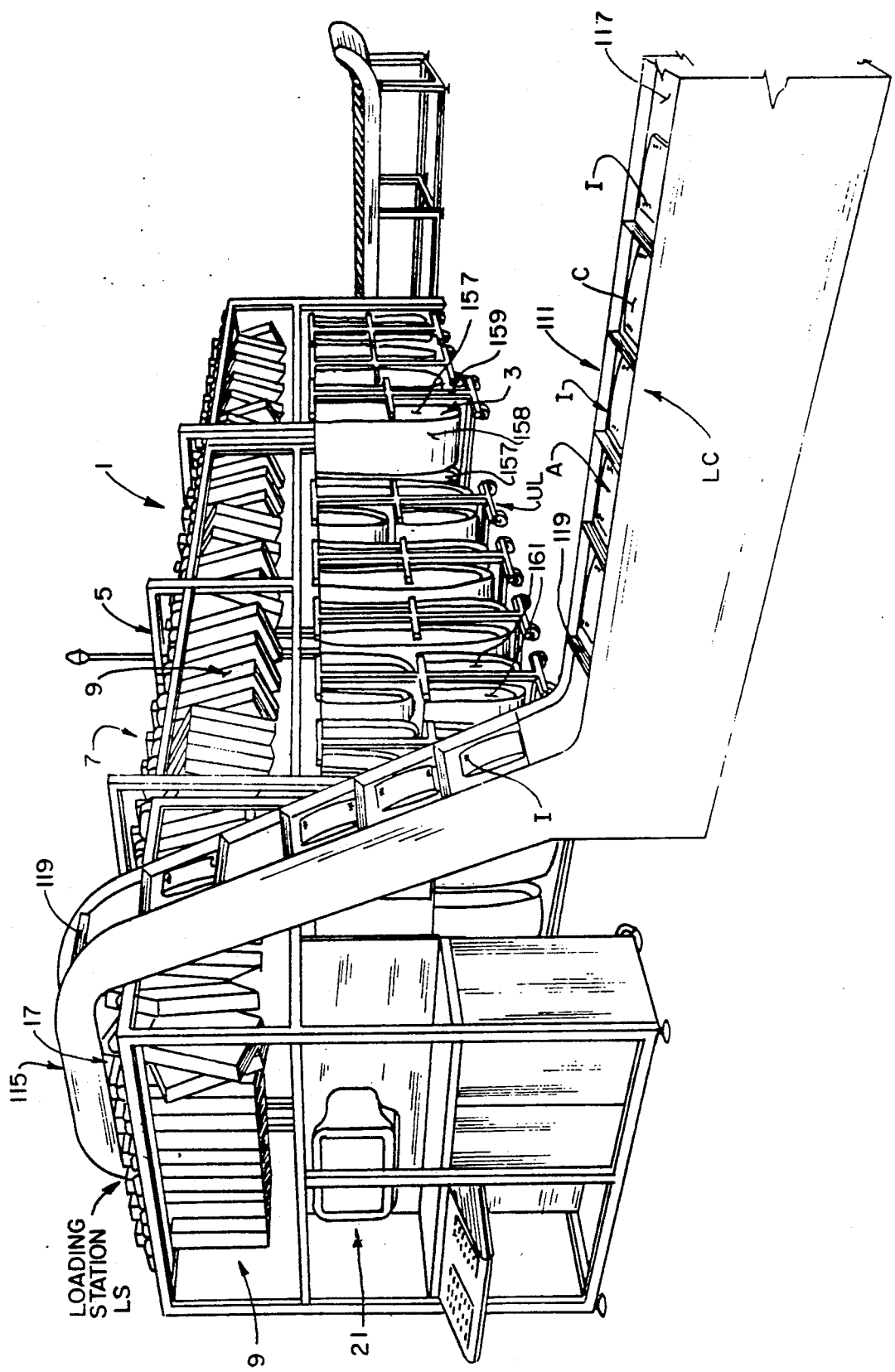
FIG. 1 is a perspective view of sorting apparatus of the present invention.

Referring now to the drawings and particularly to FIG. 1, sorting apparatus of this invention is indicated in its entirety by reference character 1. Specifically, sorting apparatus 1 sorts articles A by delivering each article to a predetermined or preselected article receiving receptacle, as generally indicated at 3, corresponding to an address associated with the article. For example, the articles A may constitute envelopes of photographs which, after processing and pricing, must be sorted for delivery to the stores which sent in the film for processing such that they can be picked up by the customer. Of course, those skilled in the art will recognize that the sorting apparatus 1 of the present invention may be utilized to sort any number of different types of articles, such as orders of printed checks in a check printing company for mailing, or for in-house mail within a large corporation or governmental agency.

More specifically, sorting apparatus 1 includes a frame 5 for supporting the sorting apparatus and its associated equipment on the floor of a suitable building or the like. The sorting apparatus comprises a conveyor, as generally indicated at 7, which in turn, is constituted by a plurality of carriers, each of which is generally indicated by reference character 9.

As best shown in FIG. 2, conveyor 7 travels around an endless path P past a multiplicity of unloading stations UL. As best shown in FIGS. 8 and 9, each unloading station UL has at least a first receptacle 11 and a second receptacle 13 spaced on opposite sides of the path P of the conveyor for receiving articles carried by the carriers and delivered to a selected one of the receptacles as the carriers are conveyed past the unloading stations UL.

Figures 11, 14:
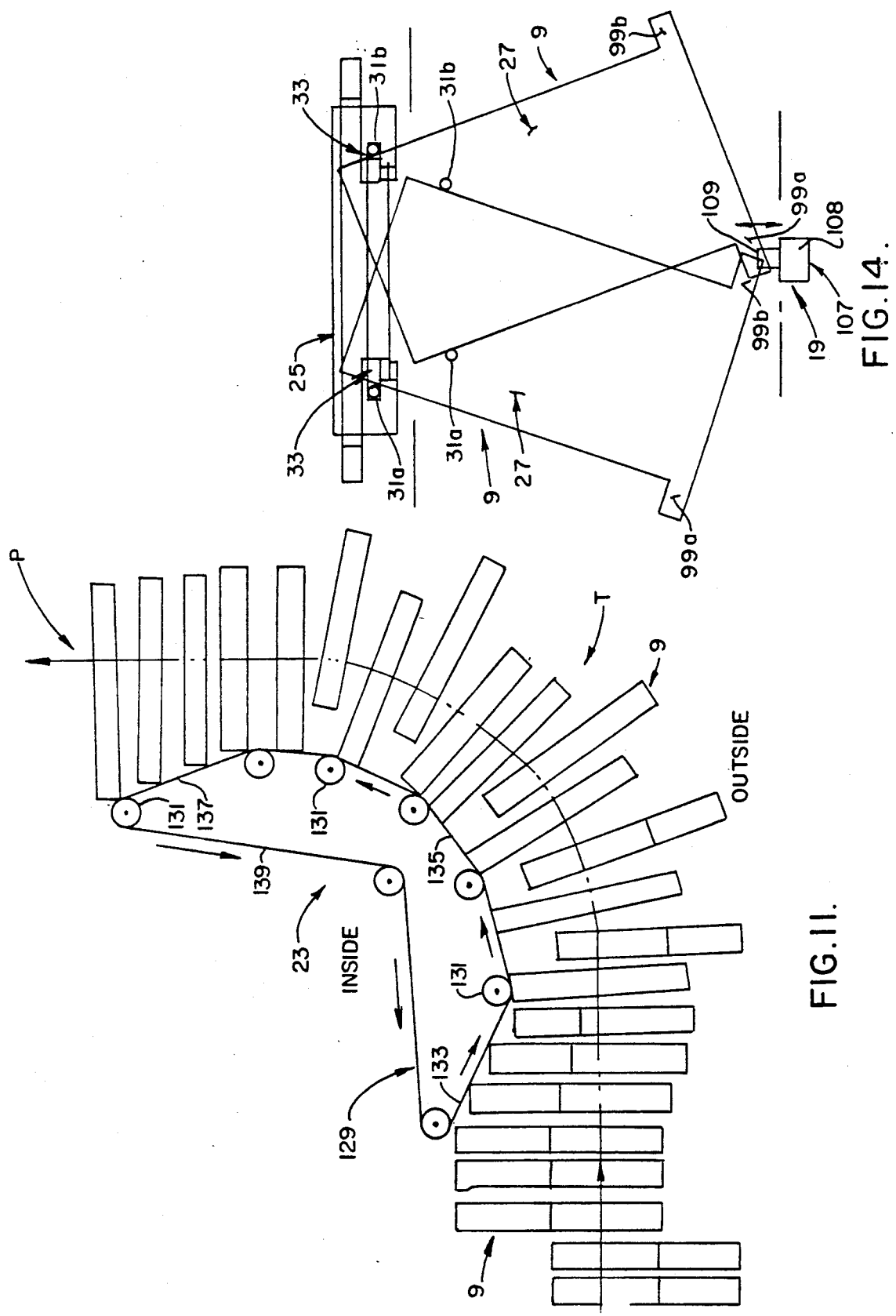
FIG. 11 is a top plan diagrammatic view taken along line 11—11 of FIG. 2 showing optional means located at the inside of a turn of the conveyor for moving certain of the carriers which are inclined toward the inside of the turn toward their vertical or centered position as the carriers move into and through the turn and for allowing the certain carriers to move from their vertical positions to their inside inclined positions as the carriers move from the turn.
FIG. 14 is a composite front elevational view of a carrier in both of its inclined positions at an unloading station illustrating a single means (e.g., a solenoid) for tripping a latch on the carrier thereby to effect the opening of the bottom door or gate of the carrier and to effect the delivery of the article carried thereby into a predetermined receptacle regardless of the inclined position of the carrier; and, FIG. 15 is an enlarged view of a portion of the carrier taken along line 15—15 of FIG. 5 illustrating details of the means for effecting movement of the carrier to one or the other of its inclined positions.

As generally indicated at 15 in FIG. 5, means is provided for connecting the carrier 9 to conveyor 7 such that the carrier may be moved along conveyor path P. In accordance with this invention, means 17 is provided for prepositioning each of the carriers in either a first or outside inclined position (as shown in FIG. 7B) or in a second or inside inclined position (as shown in FIG. 7C) such that when the carrier 9 carrying an article A therewithin reaches a selected one of the unloading stations UL, the article may be released from the bottom of the carrier for delivery into a selected one of the article receiving receptacles 11 or 13 positioned at the predetermined unloading station. As best shown in FIG. 14, means, as generally indicated at 19, is provided at each of the unloading stations UL for selectively effecting the release of the article A from a predetermined carrier 9 as the carrier moves past the unloading station.

More specifically as shown in FIG. 1, after the carriers 9 leave the loading station LS with articles received therein, the carriers are moved from their centered or loading position (as shown in FIG. 7A) to one or the other of the their inclined positions thereby to be oriented (inclined) so as to deliver the article A therein to one or the other of the receptacles 11 or 13 at a predetermined unloading station UL without further positioning or adjustment of the carrier. In this manner, only one means 17 for prepositioning all of the carriers in one of their inclined position need be provided. It will be appreciated that there is no requirement of any means at each of the unloading stations UL for effecting inclination of the carriers so as to be properly aligned with a predetermined one of the receptacles 11 or 13 at the selected unloading station UL. Compared with certain of the prior art sorters, the requirement of only one prepositioning means 17 operable on all of the carriers 9 in the sorting apparatus greatly simplifies the construction of sorting apparatus 1 of the present invention.

Each of the articles A has indicia I (e.g., a bar code or the like) which is readable by well known bar code reader equipment or the like which does not, per se, constitute part of the sorting apparatus of the present invention. The indicia I or bar code printed on each of the article A includes an address to which the particular article is to be delivered. Generally, one of the article receiving receptacles 3 positioned in the sorting apparatus 1 corresponds to the address indicia printed or otherwise affixed on each of the articles A to be sorted. As generally indicated at 21, a computer control system receives a signal from the bar code reader indicating the address of each article A being conveyed by the loading conveyer LC to the loading station LS at which each of the articles is delivered to a respective carrier 9 being conveyed past the loading station LS.

Loading conveyor LC has a series of compartments C thereon with each compartment containing one article A to be sorted. As the indicia I on each of the articles is read, computer control system 21 correlates the address of that article with a corresponding receptacle 3 in the sorting apparatus. When that article is placed in a carrier 9, the computer control system 21 is responsive to the address of the article and, in a manner as will be hereinafter explained, prepositions that carrier in one or the other of its inclined positions such that when the carrier reaches the unloading stations UL having a receptacle 3 corresponding to the address on the article, the carrier will be in a proper inclined position so as to deliver the article to its corresponding predetermined receptacle. If articles A are loaded on the loading conveyor LC which do not have a receptacle 3 in the sorting apparatus corresponding to the address on the article, the computer control system 21 will not recognize that article, but the article will, nevertheless, be delivered into one of the carriers in turn. However, before the carrier returns to loading station LS, any articles carried thereby will be dumped into an overflow receptacle (not shown) for sorting of these unsorted in another pass of the sorting apparatus when the apparatus is reprogrammed.

As generally indicated at 23, optional means may be (see FIGS. 2 and 11) provided at each of the turns T of the path P of conveyor 7 for moving (partially righting) the carriers 9 from their inside inclined position toward the inside of the turn to their centered position so as to prevent interference between adjacent carriers as the carriers are conveyed through the turn T. Each of the turns has a center of curvature on the inside of the turn and the outside of the turn is defined as the side of the conveyor opposite the center of curvature for that turn. Carrier moving means 23 will be described in detail hereinafter.

Figure 10:
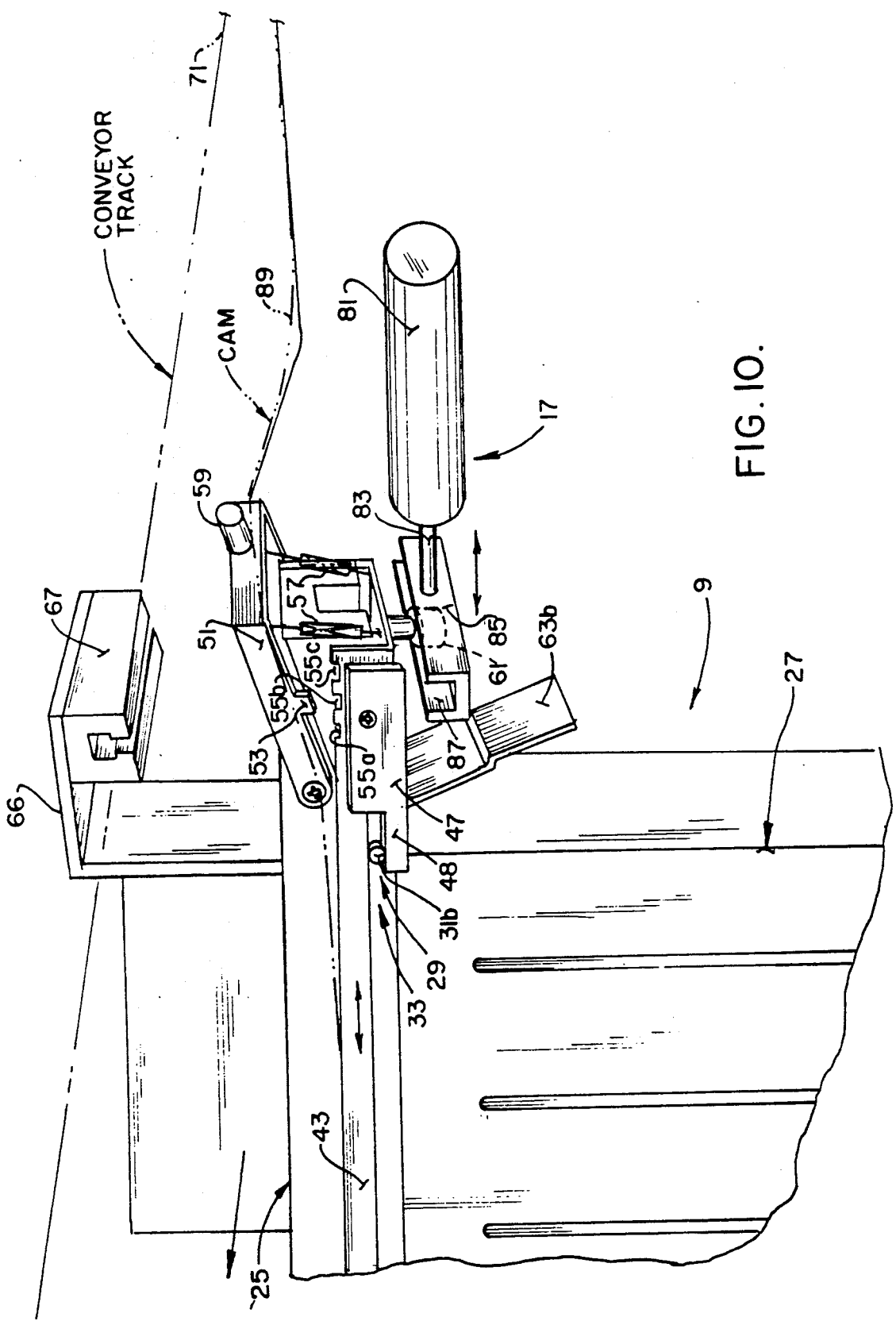
FIG. 10 is an enlarged perspective view of the upper inside portion of one of the carriers as it is mounted on the conveyor illustrating means for effecting the inclination of the carriers to one or the other of their predetermined inclined positions after having had an article loaded therein at a loading station and as the carriers move therepast.

Carrier 9 is shown in FIGS. 5 and 6 to comprise a carrier base, as generally indicated at 25, which is coupled to and movable along conveyor 7, and a carrier body, as generally indicated at 27, which is coupled to the carrier base and which receives and holds article A as the carrier 9 is moved along conveyor 7 to its predetermined unloading station UL. As generally indicated at 29, the carrier includes means for releasably coupling carrier body 27 to carrier base 25 such that the carrier body 27 may be oriented with respect to the carrier base 25 in its centered position (FIG. 7A) or in either of its inclined positions (FIG. 7B or 7C). As best illustrated in FIGS. 5, 6 and 10, this coupling means 29 comprises a pair of attachment pins 31a, 31b on each face of carrier body 27. In other words, there are four of these attachment pins, two on the front face and two on the back face of the carrier body. For purposes of brevity, only the pins on one face of the carrier will be discussed. As generally indicated at 33, latch means is provided on carrier base 25 for releasably cooperating with attachment pins 31a, 31b for securement of the carrier body 27 to the carrier base and for permitting pivotal movement of the carrier body between its centered and one or the other of its inclined positions.

Figure 12:
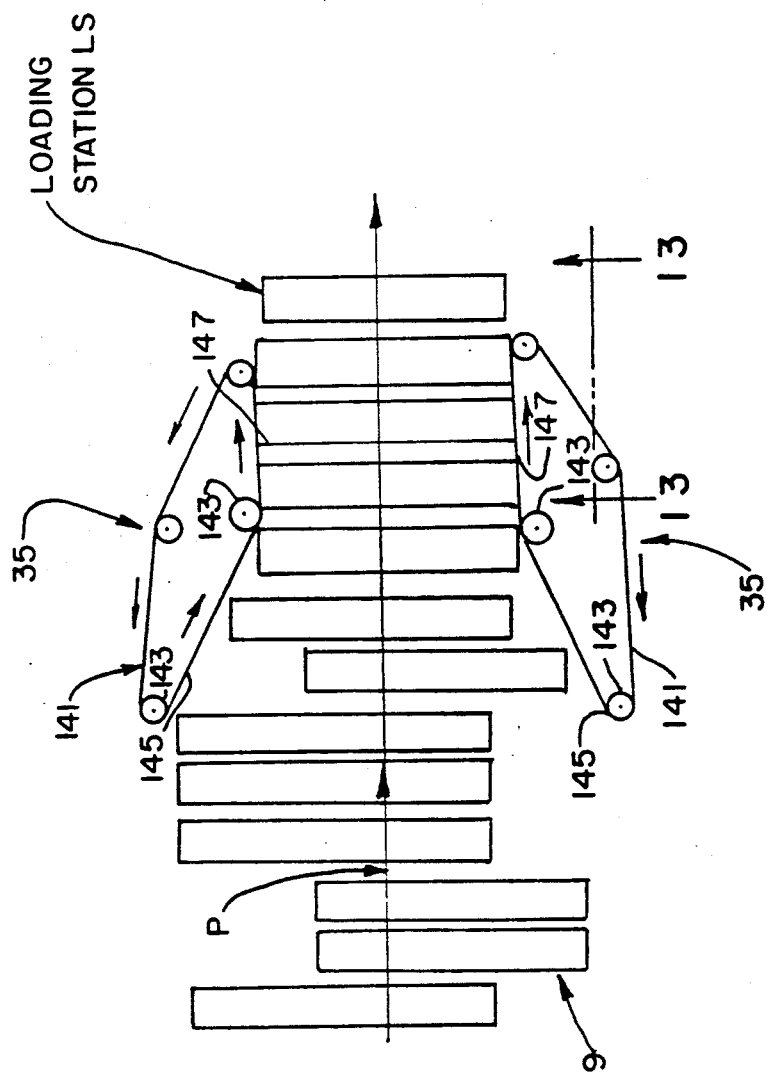
FIG. 12 is a top plan diagrammatic view of a portion of the sorting apparatus illustrating means located along the conveyor prior to the loading station shown in FIG. 3 for returning or righting each of the carriers from either of the inclined positions to their respective vertical positions as the carriers move to the loading station.

Preferably, immediately upstream from (i.e., prior to) loading station LS, means 35, as best shown in FIG. 12, is provided for righting or returning each of the carriers 9 from one or the other of its inclined positions to its centered or loading position so as to receive another article A at loading station LS. It will be understood that, within the scope of this invention, it is preferred, but not necessary, that carries 9 be righted from their inclined to their centered position before another article A is inserted therein. In addition, immediately upstream from the loading station, means, as generally indicated at 37 (see FIG. 13), is provided for for closing the carrier bottom door D which was selectively opened so as to deliver the article A carried by the carrier to a predetermined one of the article receiving receptacles 3 as the carrier was conveyed around path P.

As best shown in FIGS. 5 and 6, each carrier 9 has a minor dimension (its thickness) and a major dimension (its width). In accordance with this invention, carriers 9 are arranged on conveyor 7 (see FIGS. 1 and 2) with their major dimension perpendicular to the path of conveyor 7 such that the number of carriers that can be provided in a given length of conveyor 7 is determined by the front-to-back thickness (i.e., the minor dimension) of the carriers. For example, carriers 9 may be sized such that four of the carriers may be provided for each foot of conveyor length. It will be appreciated that this increases the "density" of the carriers over the prior art sorter as shown in the co-assigned U.S. Pat. No. 4,895,242.

Figure 15:
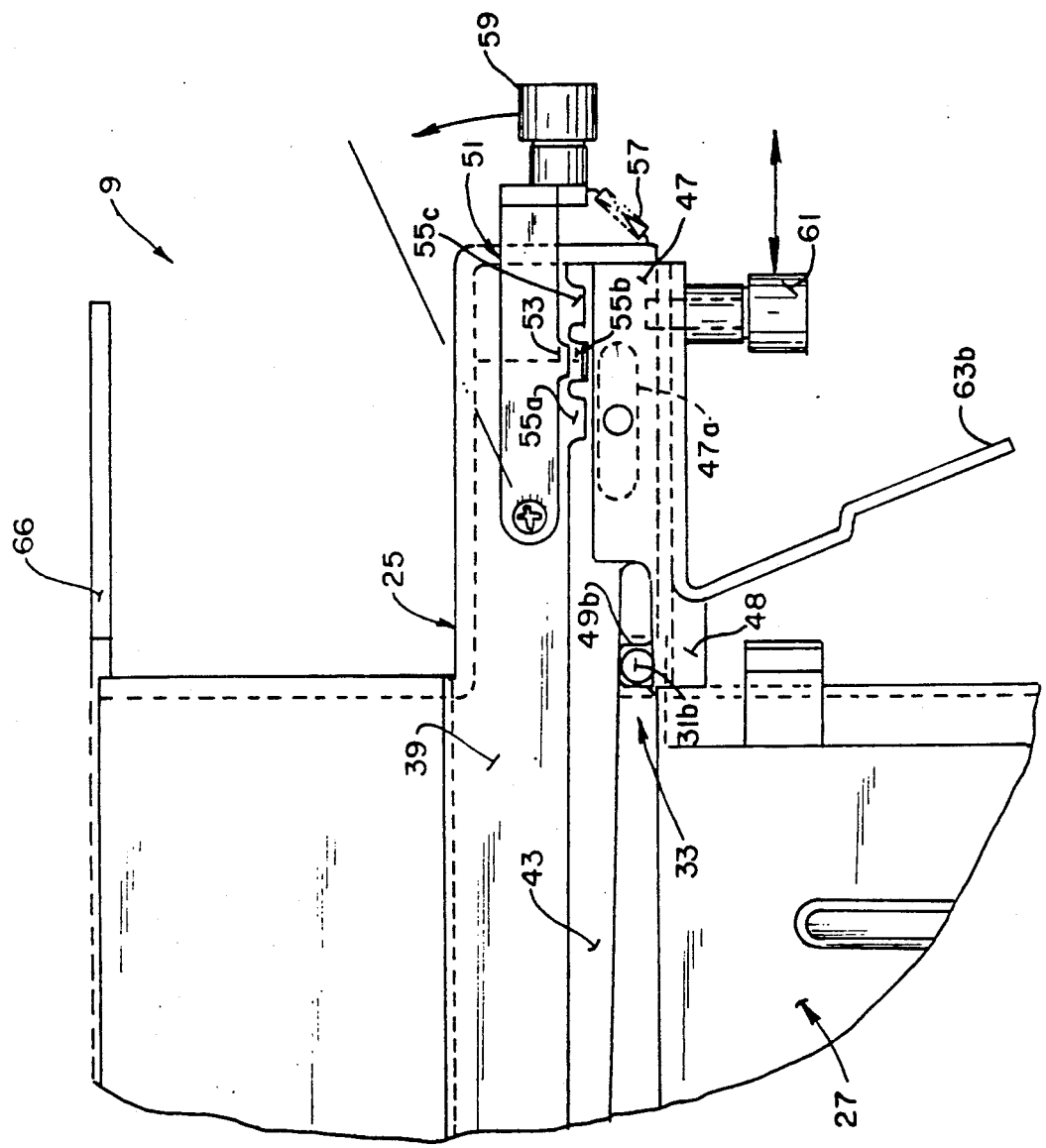

Referring now to FIGS. 5, 6 and 10, carrier base 25 is shown to comprise a base frame 39 extending transversely from one side to the other of carrier 9. The carrier base frame has an article receiving opening 41 extending vertically therethrough leading down to carrier body 27 so that an article A may be inserted downwardly at the loading station LS and received within the carrier body. Base frame 39 has a slide latch bar 43 carried thereby for back and forth (horizontal) translational movement and thus constituting a part of latch means 33. More specifically, slide latch bar 43 has a U-shaped yoke 45 at the ends of base frame 39 and one of the slide latch bars 43 is provided on the front and back face of the base frame 39 such that the yokes 45 interconnect the two slide latch bars 43. At each end of the slide latch bars, an attachment plate 47 secures the slide latch bar 43 to base frame 39, there being an elongate slot 47a (shown in dotted lines) provided in the slide latch bars for securement of the attachment plate to the base frame 39 and for permitting sliding motion of the slide latch bars. At the front and back of the base frame 39, a pair of downwardly facing attachment pin receiving notches slots 49a, 49b (as shown in FIG. 15) are provided so as to receive attachment pins 31a, 31b on carrier body 27. Each attachment plate 47 has a finger 48 extending inwardly of carrier base 25 constituting notch closure means for holding attachment pins 31a, 31b captive within notches 49a, 49b. Of course, when both attachment pins 31a, 31b are received in slots 49a, 49b and attachment plate fingers 48 cooperate with their respective attachment pins 31a, 31b so as to hold both of the attachment pins in position relative to carrier base 25, the carrier body will be securely held in its vertical or centered position, as illustrated in solid lines in FIG. 5 and as is shown in FIG. 7A. However, when latch means 33 is actuated in one direction or the other such that slide latch bars 43 move to the right or the left of the position shown in FIG. 5, a slight side-ways translational movement of carrier body 27 is effected relative to carrier base 25 (compare FIGS. 7A and 7B, 7C) thereby to move one of the pins 31a or 31b clear of its respective attachment plate finger 48 so as to permit one side of the carrier body to drop downwardly relative to the carrier base to assume one of its inclined positions. Of course, the above-noted translational movement of the carrier body also serves to move the other attachment pin farther away from the end of attachment plate finger 48 and into even more secure latching engagement with the carrier base. Thus, after carrier body 27 has been prepositioned in one or the other of its inclined position by means 17 immediately downstream from loading station LS, the carrier 3 will be conveyed around the path P of conveyor 7 with its carrier body 27 in one or the other of its inclined positions.

Slide latch bars 43 are prevented from moving relative to the carrier base 39 by means of a slide bar lock, as generally indicated at 51 (see FIGS. 5 and 15), which is pivoted on the carrier base frame 39. Specifically, slide bar lock 51 has a lug 53 on its lower side which cooperates with one of three notches 55a-55c provided in the upper face of slide latch bar 43. As indicated at 57, springs are provided for biasing slide bar lock 51 downwardly toward its locking position so as to positively prevent transverse sliding movement of the latch bar 43 relative to carrier base frame 39, except when the carrier is in position for adjustment by prepositioning means 17 and for being returned to its centered position by means 23 prior to retaining to loading station LS. On the outer end of slide bar lock 51, a cam follower roller 59 is provided. On the bottom face of the U-shaped yoke 45 of slide latch bar 43, an operating roller 61 is affixed. The function of the cam follower roller 59 and the operating roller 61 will be hereinafter described. Each carrier base 25 includes a pair of stops 63a, 63b against which the carrier body 27 bears when in one or the other of its inclined positions so as to limit the degree of inclination of the carrier body which may change somewhat, depending on the weight and size of the article A deposited within the carrier.

Referring to FIG. 5, means, as indicated at 65, is provided for attaching the carrier 9 to conveyor 7 and for effecting movement of the carrier around conveyor path P. Specifically, this carrier attachment means comprises a carrier attachment arm 66 extending laterally outwardly from the upper end of carrier base 25 toward the inside of the conveyor 3. As shown in FIG. 5, roller block 67 is mounted on the bottom face of the attachment arm 66 and the roller block is provided with a pair of rollers 69 which roll on a conveyor rail 71 which is supported by frame 5 of the sorter and which extends continuously around path P of the conveyor. A conveyor drive chain 73 is pivotally attached to the upper face of arm 66. It will be understood that conveyor drive chain 73 is driven around the path of conveyor 3 by a conventional drive motor and sprocket gear drive (not shown) in a manner well known to those skilled in the art. On the side of carrier base frame 39 opposite arm 66, a conveyor roller 75 extends out from the end of carrier base frame 39 and bears on a carrier support ledge 77 affixed to frame 5 and extending around the path P of conveyor 7 on the outside thereof. In this manner, each of the carriers 9 is rollingly supported on rail 71 and on ledge 77 by means of rollers 69 in roller block 67 at the inside of the conveyor and by means of roller 75 on the outside of the conveyor.

As best shown in FIG. 10, means 17 for prepositioning the carriers 9 in one or the other of their inclined positions comprises a fluid (air) operated cylinder or actuator 81 responsive to computer control system 21 for shifting slide latch bar 43 in one direction or the other relative to carrier base frame 39 thereby to effect the release of one or the other of the attachment pins 31a, 31b from the carrier base such that one side of the carrier body 27 will drop downwardly relative to the carrier base 25 thus assuming one or the other of its inclined positions. Specifically, fluid cylinder 81 is secured to frame 5 and has an operating rod 83 which may be forcibly extended or retracted in a direction generally perpendicular to the line of travel of the conveyor. A channel 85 is affixed to the end of operating rod 83 and the channel has an upwardly facing slot 87 for receiving the operating roller 61 of one of the carriers as the carrier is conveyed along path P, preferably (but not necessarily) immediately after the carrier has had an article A loaded therein at loading station LS. A cam 89 is also provided immediately downstream from loading station LS which engages cam follower roller 59 on the end of slide latch bar lock 51. In this manner, as the cam follower 59 engages cam 89, the slide bar lock 51 and its lug 53 are raised clear of notches 55a-55c in the upper face of slide latch bar 43. Thus, upon actuation of fluid cylinder 81, lateral shifting of slide latch bar 43 is permitted thereby to effect the release of one or the other of the attachment pins 31a, 31b from carrier base 25 and thus allowing one side of the carrier body 27 to fall downwardly such that the carrier body assumes one or the other of its inclined positions. Of course, operation of fluid cylinder 81 is under the control of computer control means 21 such that each carrier is inclined in one or the other of its inclined position in response to the address indicia I on the article A loaded in each carrier such that as that carrier reaches a selected one unloading station UL, it is prepositioned in the proper one of its inclined positions so as to deliver the article A carried thereby into a predetermined receptacle 3 corresponding to the address of the article A. As each carrier continues to move along conveyor path P, its operating roller 61 will move clear of channel 85 and cam 89 will again allow slide bar lock 51 to move downwardly under the bias of spring 57 such that lug 53 will be received in one of the notches 55a or 55c in slide latch bar 43 thereby to positively to lock the slide latch bar in one or the other of its shifted positions so as to positively lock one of the attachment pins 31a or 31b within its respective notch 49a, 49b in slide latch bar 43. In certain instances, it may be desirable to provide another cam surface (not shown) engageable with cam follower 59 from above thereby to force the slide bar lock 51 down so as to insure that lug 53 is received in one of the notches 55a or 55c.

Again referring to FIGS. 5 and 6, as heretofore mentioned, each of the carriers 9 is provided with a bottom opening door D. Specifically, door D comprises a door member 91 extending transversely of the carrier from one side thereof to the other and pivotally attached to the bottom of the carrier at the leading or front bottom end thereof by means of a door hinge pin 93. A torsion spring 95 is mounted on hinge pin 93 so as to bias door 91 toward its open position, as shown in FIG. 6. A spring biased door latch 97 is provided at the other side of the carrier (i.e., on the trailing side) such that when the door member 91 is closed, the door latch 97 will hold the door closed. Door latch member 97 has tabs 99a, 99b extending beyond the sides of the carrier, as best shown in FIG. 5. Further, door latch 97 has door latch notches 101 at each side thereof for receiving the lower edge of door member 91 when the latter is moved toward its closed position. Door latch member 97 is pivotally secured to the bottom end of carrier body 27 by means of a door latch hinge pin 103 extending transversely of the carrier body. A latch spring 105 is received on door latch hinge pin 103 so as to bias the door latch member 97 toward carrier door member 91. It will be appreciated that as door member 91 is moved from its open position toward its closed position, the bottom edge of the door member 91 will cammingly engage the lower portion of door latch member 97 thus forcing the door latch member to move away from the bottom of carrier body 27. When the bottom edge of door 91 is received in latch notches 101, torsion spring 105 biases the door latch member 97 toward door member 91 and thus positively holds the door in its closed position.

As heretofore stated, means 19 is provided at each of the unloading stations UL for effecting the release of an article A from a preselected carrier 3 as that carrier moves into register with the unloading station thereby to effect the release of the article from within the carrier and to deliver it to a predetermined article receiving receptacle 3. As best shown in FIG. 14, this article release means 19 is shown to comprise a solenoid actuator, as indicated at 107, at each of the unloading stations. Solenoids 107 are positioned generally vertically below the center line of the conveyor path P. Each of these article release solenoids 107 is operable in response to computer control system 21 for effecting the opening of door member 91 of its predetermined carrier.

More specifically, each solenoid 107 comprises an actuator coil 108 securely mounted on a portion of frame 3. The solenoid actuator further includes a trip finger or 109 movable vertically upwardly and downwardly between a retracted position clear of the carriers conveyed therepast and an extended actuating position (as illustrated in FIG. 14) for engagement by one of the door latch tabs 99a or 99b as the carrier moves thereabove. As best shown in FIG. 14, with the solenoid actuator located generally beneath the center of the conveyor path, with the carrier body 27 of any one of the carriers in either of its inclined positions (i.e., whether its inclined toward the inside or the outside of the conveyor, as shown in FIGS. 7B or 7C, respectively), one of the tabs 99a or 99b either on the inside or the outside of the door latch 97 will be positioned generally above the location of the solenoid actuator 107 such that when the actuator is energized and such that when the movable trip finger 109 is raised to its actuating position, the trip finger will be contacted by one or the other of the door latch tabs 99a, 99b as the carrier is moved along conveyor path P. This, in turn, causes the door latch member 97 to move away from door member 91 thus causing the bottom edge of the door to move clear of notches 101 in the latch member. In this manner, the torsion door spring 95 causes the door to snap open thus releasing the article A carried by the carrier 9 for delivery into a predetermined one of the receptacles 11 or 13 at the selected one unloading station.

It will be understood that because only one actuator 107 need be provided at each of the unloading stations UL to effect the opening of the door 91 of a selected carrier 9, regardless of whether that carrier is prepositioned in either its first (or outside) inclined position (as shown in FIG. 7B) or in its second (or inside) inclined position (as shown in FIG. 7C), the one actuator will effect the release of the article carried thereby.

Referring now to FIGS. 1-4, loading conveyor LC is shown to comprise a horizontal loading reach 111 at which articles A are placed on the loading conveyor. The loading conveyor further includes an inclined section 113 leading up to an inserting reach 115 of t he conveyor such that the articles may be positively loaded or inserted into the tops of the carriers 9 as the carriers are conveyed beneath the end of the inserting reach at loading station LS. The loading conveyor comprises a belt 117 entrained around conveyor rollers (not shown). A plurality of sweeps 119 extend transversely of the conveyor and divide the various reaches of the upper face of the belt 117 into conveyor compartments C (see FIG. 1) each sized to hold an article A to be sorted.

Within the broader aspects of this invention, those skilled in the art will recognize that means other than a belt conveyor may be used to insert articles A into carriers 9. For example, a pair of overrunning nip rolls may be used to positively drive the articles into the carriers.

In accordance with this invention, sweeps 119 are driven along the path of loading conveyor LC at a somewhat higher surface speed than the surface speed of belt 117. This causes the sweeps 119 to engage the trailing end of the articles A placed thereon and to slide the articles forward on belt 117 at a speed faster than the belt. In this manner, the trailing ends of the articles are positively held against their respective sweep 119. Thus, the timing of the articles A on belt 117 with respect to the movement of carriers 9 beneath loading station LS is insured.

As best shown in FIG. 4, each sweep 119 has a plurality of spaced sweep fingers 121. At the article insertion end of inserting reach 115 of loading conveyor LC, a guide 123 is provided in spaced relation to belt 117 having a series of spaced fingers 125 adapted to be interleaved with sweep fingers 121. The guide fingers 125 are spaced from the upper surface of belt 117 and form a guide channel through which the article A to be inserted into carriers 9 is guided. As sweep 119 is entrained around the end roller (not shown) of the inserting reach 115 of the loading conveyor, the surface speed of the sweep is preferably greater than the velocity at which the articles A would free fall from the conveyor such that sweep fingers 119 engaging the trailing edge of article A positively drive the article downwardly between the belt and the guide fingers 125 into a guide nozzle 127 thus effecting the rapid insertion of an article into the article opening 41 of a respective carrier 9 being conveyed beneath nozzle 127 at loading station LS. In this manner, articles A are positively loaded into carriers 9 at a speed higher than can be accomplished by the free fall of the articles from the end of the loading conveyor and the articles are loaded into the carriers in timed relation to the sweeps 119 on the loading conveyor which in turn are timed with respect to movement of carriers 9 along conveyor 7.

It will be understood that means other than sweeps 119 may be utilized to forcibly insert articles A into carriers 9 at a speed faster than they may free fall from the loading conveyor. For example, at the insertion end of the loading conveyor article A may pass through the nip of a pair of rollers (not shown) which are driven at high speed so as to positively grip the article therebetween and to eject it downwardly into a carriage therebelow at a speed faster than if the article would free fall into the carrier. It will be further understood that means other than a conveyor belt 117 may be used to move articles A up inclined section 113. For example, sweeps 119 may move along a stationary surface.

Referring now to FIG. 11, as heretofore mentioned, at the inside of each of the turns T of conveyor path P, means 23 may optionally be provided for moving any of the carriers 9 from their inside inclined position toward their centered position as the carriers are moved into and through turn T, and then are allowed to again assume their inside inclined position as the carriers move from turn T. This last-said means serves to prevent adjacent carriers inclined toward the inside of the turn from interfering with one another as they move through the turn. Specifically, means 23 is shown to comprise an endless belt 129 entrained around a plurality of idler rollers 131 mounted on frame 5 at the inside of turn T of conveyor path P. As shown, belt 129 has a lead section 133 which is inclined in such direction as to be engaged by the inner edges of the carriers 9 inclined toward the inside of the turn as these carriers approach the turn. Once a carrier engages lead reach 133 of belt 129 and as the carrier continues to move into turn T, reach 133 applies a force to the carrier tending to rotate the carrier about its attachment pins 31b on the inside of the carrier body coupling the carrier body to the carrier base and thus rotating the carrier body upwardly toward its centered position (as shown in FIG. 7A). Belt 129 has an outer reach 135 which is entrained around idler rollers 131 positioned so as to maintain the belt at a location corresponding generally to the inside sides of carriers 9 substantially in their centered positions as the carriers are conveyed through turn T. It will be understood, however, that the carriers need not be fully returned to their centered position (as shown in FIG. 7A) as they are conveyed through turn T, but only that they be moved outwardly toward their centered positions so as to prevent interference between adjacent carriers. It will also be understood that the outer attachment pin 31a of each of the carriers will not become latched to its respective carrier base as the carriers are moved toward their centered positions and as the carriers are conveyed through turn T. In this manner, the weight of the carrier pivotally suspended from attachment point 31b will bias the carrier body into engagement with the outer face of reach 135 as the carrier is conveyed through turn T. Further, as the carriers are conveyed from turn T, a trailing reach 137 of belt 129 is provided which allows the carriers initially inclined toward the inside of the conveyor to again assume their inside inclined positions (as shown in FIG. 7C) as the carriers are conveyed from turn T. Of course, endless belt 129 is provided with a return reach 139.

It will be understood by those skilled in the art that the exact configuration and number of idler rollers 131 in each means 23 may be varied considerably. Further, means other than the endless belt 129 and idler rollers 131 may be utilized to constitute means 23 for moving the carriers from their inside inclined positions toward their centered position as the carriers are moved through turn T. For example, a plurality of closely spaced rollers (not shown) may be provided conforming generally to the lead reach 133, the outer reach 135, and the trailing reach 137 of belt 129. However, at the present time, endless belt 129 is preferred because the belt, particularly intermediate the idler rollers 131, tends to cushion the contact between the carriers and the belt as the carriers engage the lead reach 133 of the belt upon approach to turn T.

It will be understood that the above-described carriage moving means 23 may be preferred, but it is not essential to the operation of the sorting apparatus of the present invention. It will be appreciated that as carriers 9 increase in width and as the spacing between the carriers on conveyor 7 decreases, the desirability of means 23 increases.

Referring to FIG. 12, means 35, as previously described, is provided along conveyor path P on both sides thereof upstream from (prior to) loading station LS for returning carriers 9 from either of their inclined positions to their center position and for latching the carriers in their centered position. Specifically, on each side of conveyor path P is provided an endless carrier righting belt 141 entrained around a plurality of idler rollers 143 mounted to frame 5. Each righting belt 141 has a lead reach 145 positioned to be engaged by the outer edge of a carrier 9 in its inclined position. The lead reach 145 of belt 141 extends inwardly toward the center line of the conveyor path P such that a carrier body 27 in engagement with the lead reach will be righted from its inclined position to its centered position. With the carrier body moved substantially toward its centered position, cam follower 59 on slide bar lock 51 is lifted by cam 89 so as to unlock slide lock 43 such that the slide latch bar will, under the force supplied to the carrier by righting belts 141 move toward its centered position at which point both of said attachment pins 31a and 31b are positively retained to carrier base 25 by latch means 33. Each of the righting belts 141 includes a center reach 147 positioned to hold the carriers in their centered positions between the belts on opposite sides of the carriers.

Figure 13:
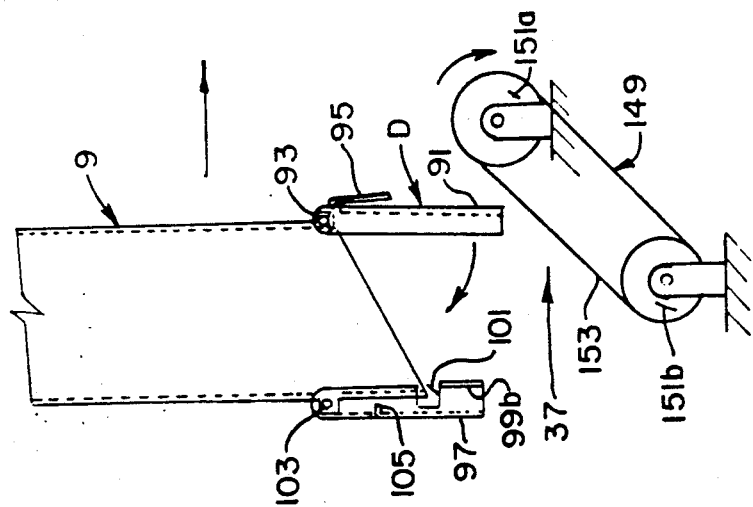
FIG. 13 is a side elevational view taken along line 13—13 of FIG. 12 showing means located along the path of the conveyor in conjunction with the carrier returning or righting means for closing the bottom door of each of the carriers prior to the carriers reaching the loading station.

In conjunction with righting belts 141 and spaced generally below the location of center reaches 147 of belts 141 is provided the above noted means 37 for closing doors D of carriers 9 as the carriers are conveyed therepast on their way to loading station LS. More specifically, door closing means 37 is shown in FIG. 13 to comprise a door closing belt 149 entrained around an upper and lower idle roller 151a, 151b, respectively, with the lower idler roller 151b spaced upstream relative to the movement of carriers 9 such that the belt 149 has an inclined door closing reach 153 positioned to be engaged by the lower edge of open door members 91 as the carriers 9 are moved along conveyor path P. The upper roller 151a is positioned height-wise with respect to carriers 9 such that as the carriers are moved past the upper roller, door member 91 will be pivoted upwardly about a hinge pin 93 toward its closed such that the lower edge of door member 91 cammingly engages the pivoted door lock latch member 97 and causes the lower edge of the door member 91 to be received in latch notches 101 thus securely latching the door member 91 in its closed position. Door closing belt 149 and upper roller 151a will, however, permit a carrier with its door closed to readily move therepast.

In this manner, through the use of carrier or righting belts 141 and door closing belt 149, carriers 9 are returned to their centered positions and doors D are positively closed and latched as the carriers move into loading station LS such that each of the carriers is properly configured to receive another article A to be sorted.

Those skilled in the art will recognize that articles A may be inserted into carriers 9 and loading station LS by loading conveyor LC without first moving the carriers from one of their inclined positions to their centered position. Thus, the requirement of righting means 35 is optional. Of course, if it is not necessary to right the carriers prior to loading an article A therein, the complexity and cost of the sorting apparatus may be reduced.

Referring to FIGS. 8 and 9, different arrangements of article receiving receptacles 3 at each of the unloading stations UL are depicted. As shown in FIG. 8, at each unloading UL, a pair of so called high volume receptacles, as indicated respectively at 155, 157, are shown with receptacle 155 constituting the outside receptacle on the outside of conveyor path P and with receptacle 157 constituting the inside receptacle on the inside of the conveyer path. For example, these high volume receptacles may have a width in the direction of movement of conveyer C of approximately 6 inches and maybe configured to a hold 80-120 packages of photographic prints, negatives, and the like in each of the high volume receptacles. It will be appreciated that four of these heavy collectors 155 and 157 may be provided for each foot of active length of conveyer 7. As shown in FIG. 1, these heavy receptacles may be relatively large size mail bags 158 suspended beneath conveyer 3 with their mouths held open by a bag cart 159. The high volume bags 155 and 157 take up substantially the entire height of the bag cart between the floor and the bottoms of carriers 9.

Further in accordance with this invention, at certain others of the loading stations UL, low volume receptacles 161, 163 may be provided on bag carts 159. Generally, these low volume receptacles 161, 163 are bags somewhat smaller than the bags utilized for the high volume receptacles 155, 157. As illustrated, the low volume receptacles 161, 163 may be suspended on the bag carts 159 at two elevations with the lower receptacles or bags having a chute 165 positioned beneath the carriers in their inclined position so as to receive articles dropped therefrom to guide the articles downwardly between the upper bags toward the lower bags. In this manner, up to twice the number of receptacles or drops may be provided along conveyer path P, as compared to the high volume receptacles 155, 157.

In operation, with loading conveyer LC and with carrier conveyer 7 operating, one article A to be sorted is placed in each compartment C on the loading reach 111 of the loading conveyer. Each of the articles has indicia I (e.g., a bar code) affixed thereto which is by a bar code reader (not shown) in the conventional manner. The indicia I includes information giving an address to which that particular article is to be delivered.

Computer control system 21 is responsive to indicia I on articles A. The computer control system matches the address of an article A on the loading conveyer LC with a carrier 9 being conveyed around path P of conveyer 7. As the article is conveyed on loading conveyer LC, it is forcibly loaded in timed relation to the movement of carriers 9 along conveyer 7 such that the computer control system accurately keeps track of the address of the article delivered into each of the carriers at the loading station. Then, means 17 (see FIG. 10) for prepositioning carriers 9 in one or the other of their inclined position is operated in response to the computer control system 21 so as to preposition each of the carriers to either their inside or outside inclined position such that as each of the carriers arrives at its selected one unloading station UL, the carrier will already be prepositioned so as to deliver the article carried thereby into its predetermined receptacle 3 at the selected one unloading station. It will be understood that carriers 9 are preferably prepositioned in one of their inclined positions after an article A has been inserted therein. However, in certain applications, the articles may be inserted in the carriers after the carriers have been prepositioned.

As a carrier 9 moves from the loading station LS with its respective article A loaded therein, carrier body 27 will initially be in its centered position, as shown in FIG. 7 A. Cam follower 59 on slide bar lock 51 is engaged by cam 89 thus lifting the slide bar lock lug 53 clear of one of the notches 55a-55c in slide latch bar 43. Substantially simultaneously, the operating roller 61 on the bottom of yoke 45 of slide latch bar 43 is received in slot 87 of channel 85 such that upon actuation of fluid cylinder 81 under the control of computer control system 21, the operating roller 61 will be caused to move inwardly or outwardly relative to a carrier base frame 39 so as to effect translation or shifting movement of slide latch bars 43 relative to base frame 39 thus effecting the release of one of the attachment pins 31a, 31b from latch means 33 and simultaneously positively retaining the other of the attachment pins in the latch means. Thus, one side of the carrier body 27 is permitted to fall downwardly thus causing the carrier body to pivot with respect to its carrier base 25 about the attachment pin 31a or 31b remaining secured by latch means 33. In this manner, each of the carrier bodies is prepositioned in one or the other of its predetermined inclined positions in response to the indicia I carried on its respective article received therein such that as the carrier arrives at a selected one of the unloading stations UL, the carrier body is predisposed in one or the other of its inclined positions so as to deliver the article into its predetermined receptacle 3 upon opening of carrier door member 91.

After the carrier bodies 27 have been prepositioned in one or the other of their respective inclined positions, as above described, the carriers are conveyed along path P of carrier 7 until they reach the selected one of their loading stations UL, as determined by the indicia I on the article carried therewithin and by computer control means 21. As a specified carrier 9 moves into its selected one unloading station UL, computer control system 21 will cause an appropriate signal to be sent to the solenoid 107 associated with the selected one unloading station UL so as to effect movement of trip finger 109 from its lower retracted position to its raised operational position (as shown in FIG. 14) at which point it will engage one of the tabs 99a or 99b provided on door latch 97 thereby to effect the opening the carrier door 91 and thus to permit the article A carried by the carrier to fall downwardly for delivery into the predetermined one of the receptacles 11 or 13 provided at the selected one unloading station UL.

As the carriers 9 are conveyed around conveyer path P and as they approach a turn T in the conveyer path, the carriers inclined toward the inside of the conveyer will engage the lead reach 133 of belt 129 so as to effect movement of the carriers from their inside inclined position toward their center position. The outer reach 135 of belt 129 holds these carriers toward their centered position as the carriers are moved through turn T. As the carriers move out of turn T, the carriers initially inclined toward the inside of the conveyor are gravity biased to remain in contact with trailing reach 137 of belt 129 thereby to again assume their inside inclined positions. As noted, belt 129 prevents the adjacent carriers inclined toward the inside of the conveyer from physically interfering with one another or jamming as the carriers are moved through turn T.

As the carriers begin to approach a loading station LS, a single door latch actuator (not shown) similar to solenoid trip finger or plunger 109 is provided beneath the path of conveyer 7 so as to engage the tabs 99a, 99b of any of the door latches 97 of carriers from which the article carried thereby has not been dumped at a selected one of the unloading stations UL. Thus, any article remaining in any one of the carriers will be dumped from the carrier prior to another article being loaded therein.

Further, as carriers 9 on conveyor 7 approach the loading station LS, they are engaged by one or the other of the righting belts 141 so as to move the carriers from either one of their inclined positions toward their centered position. Additionally, the open carrier doors D engage door closing belt 149 so as to insure that each of the carrier doors are closed and latched prior to another of the articles being there into the loading conveyer LC. Thus, after another article has been loaded into the carrier, in the manner here before described, one cycle of the sorting apparatus has been completed. It will be understood that the conveyer 7 of the sorting apparatus of the present invention runs continuously.

In view of the above, it will be seen that the several objects and features of this invention are achieved and other advantageous results attained.

As various changes in the above constructions and methods without departing from the scope of the invention, it is intended that all matter contained in the above description or shown in the accompanying drawing be interpreted as illustrative and not in a limiting sense.

What is claimed is:

1. Apparatus for sorting articles into a selected one of a multiplicity of article-receiving receptacles, said apparatus comprising a plurality of carriers, means for conveying said carriers together with said articles received therein along a path, a loading station along said path at which articles to be sorted are loaded into said carriers, a plurality of unloading stations along said path, each said unloading station having at least a first article-receiving receptacle on one side of said path and a second article-receiving receptacle on the other side of said path, means for supporting each of said carriers on said conveying means as said carrier is conveyed along said path in a generally vertical loading position, in a first inclined position in which an article unloaded from said carrier at a selected one of said unloading stations is delivered to said first article receiving receptacle, or in a second inclined position in which an article unloaded from said carrier at said selected one of said unloading stations is delivered to said second receptacle, means for prepositioning a selected one of said carriers in one of its said inclined positions as said selected one carrier moves along said path to said selected one unloading station, and means at said selected one unloading station for effecting the unloading of said article from said selected one carrier thereby to deliver said article carried by said selected one carrier to a predetermined article receiving receptacle at said selected one unloading station.

2. Apparatus as set forth in claim 1 wherein said path is an endless path from said loading station past said unloading stations and back to said loading station, said path having at least one turn therein, said turn having an inside toward the center of curvature of said turn and an outside away from said center of curvature, and means for moving said carriers inclined toward the inside of said turn toward a more vertical position as said carriers approach and move through said turn and for returning said carriers to their respective said one inclined positions as said carriers exit said turn.

3. Apparatus as set forth in claim 1 wherein each of said articles has indicia corresponding to a predetermined one of said receptacles at a selected one of said unloading stations said article is to be delivered, and wherein said prepositioning means comprises means responsive to said indicia for prepositioning a carrier carrying said article in one of its said inclined positions thereby to deliver the article in this last-said carrier to its respective predetermined one receptacle as the last-said carrier is conveyed past said selected one unloading station.

4. In a sorter as set forth in claim 3 wherein said carrier body in plan has a major dimension and a minor dimension with said carrier body being oriented with respect to said path such that its said major dimension is transverse to said path.

5. In a sorter as set forth in claim 3 wherein each of said carriers has a door which when closed holds said article in said carrier as said carrier is conveyed from said loading station to said selected one of said unloading stations.

6. In a sorter as set forth in claim 3 further comprising control means responsive to said indicia associated with each of said articles for identifying the one receptacle to which each said article is to be delivered, each of said unloading stations having means actuable by said control means for effecting the opening of said door of said carrier at a selected one of said unloading station thereby to effect the delivery of the article carried thereby to its said selected one receptacle.

7. In a sorter as set forth in claim 6 wherein said carrier door is biased for movement to its open position, and wherein each of said carriers has latch means cooperable with said carrier door for holding said door in its closed position.

8. In a sorter as set forth in claim 7 wherein said door opening means comprises a single actuator at each of said unloading stations selectively movable from a retraced position in which said carriers may move past said actuator without said actuator effecting the opening of said door and an operable position in which said actuator cooperates with said latch means for effecting the opening of said door regardless of the inclined position of said carrier.

9. In a sorter as set forth in claim 8 wherein said latch means comprises at least one finger extending sideways from said carrier, said finger being engageable by said actuator for effecting opening of said door.

10. In a sorter as set forth in claim 9 wherein with said carrier body inclined in its said first inclined position a first one of said fingers is in position to be engaged by said door opening actuator, and with said carrier inclined in its second inclined position a second of said fingers is in position to be engaged by said door opening actuator.

11. In a sorter as set forth in claim 7 further comprising means for closing said doors of said carriers as said carriers move toward said loading station.

12. Apparatus as set forth in claim 1 wherein said path is an endless path from said loading station past said unloading stations and back to said loading station, said apparatus having means for moving said carriers from either of their said inclined positions to said generally vertical loading position as said carrier moves into said loading station.

13. In a sorter having a conveyor movable along a predetermined endless path from a loading station past a plurality of unloading stations and back to said loading station, each of said unloading stations having at least two article receiving receptacles there at, one on each side of the line of travel of said conveyor along said path, said conveyor having a plurality of carriers for receiving an article to be sorted, for transport of said article along said path, and for unloading said article at a selected one of said unloading stations for delivery of said article into a predetermined one of said receptacles at said selected on unloading station, said path having at least one turn therealong with said turn having an inside toward and an outside, wherein said improvement comprises: each said carrier having a carrier base movable with said conveyor along said path, a carrier body for receiving and holding an article, and means for coupling said carrier body to said carrier base, said coupling means comprising a pair of spaced attachment points on one of said carrier parts, latch means on the other of said carrier parts for receiving said attachment points such that with both of said attachment points received and latched by said latch means said carrier body is coupled to said carrier base in a centered position substantially centered with respect to said path, said latch means being operable such that with one of said attachment points unlatched said carrier body will pivot downwardly from said carrier base about said other attachment point received in said latch means thereby to assume a first inclined position in which said article carried in the carrier body is positioned for being unloaded at said selected one of said unloading stations such that said article will be delivered into its predetermined receptacle, and such that with said one attachment point received in said latch means and said other attachment point unlatched from said carrier base said carrier body pivots about said one attachment point received in said latch means thereby to assume a second inclined position in which said article carried in said carrier body is positioned for being unloaded at said selected one unloading station into the other of said receptacles at said selected one unloading station.

14. In a sorter as set forth in claim 13 further comprising means along said path for moving certain of said carrier bodies inclined toward the inside of said turn from its said one inclined position toward its said centered position as said carriers move into and through said turn thereby to permit adjacent carriers prepositioned in their respective said one inclined position toward the inside of said turn to move through said turn without interfering with one another.

15. In a sorter as set forth in claim 14 further comprising means for moving said certain carrier bodies back to said one inclined position as said certain carriers move from said turn.

16. In a sorter as set forth in claim 13 wherein each of said carriers is in its centered position at said loading station as said article is loaded therein.

17. In a sorter as set forth in claim 13 further comprising control means responsive to indicia associated with each of said articles for the delivery of each said articles in a corresponding one of said receptacles.

18. In a sorter as set forth in claim 17 further comprising means responsive to said control means for prepositioning each said carrier body in one of its said inclined positions after an article has been loaded therein so as to be in position to deliver said article to its said corresponding predetermined one receptacle.

19. In a sorter as set forth in claim 18 wherein said prepositioning means selectively effects the release of said latch means associated with one or the other of said attachment points thereby to incline said carrier body in one of its said inclined positions thereby to permit delivery of said article to said predetermined one receptacle.

20. In a sorter as set forth in claim 13 wherein said latch means comprises a pair of spaced notches in a latch member receiving said attachment points, means for closing said notches thereby to hold a respective attachment point captive therein, said latch member and said notch closure means being shiftable relative to one another such that with said carrier body initially in its centered position and with said notches being shifted toward one of said attachment points, said other attachment point being released from said carrier base thereby to permit said carrier body to move to its said first inclined position, and with said carrier body in its centered position and with said notches being shifted in the opposite direction, said one attachment point is released from said carrier base thereby to permit said carrier body to move to its said second inclined position.

21. In a sorter as set forth in claim 20 wherein said means for prepositioning said carrier bodies in one or the other of their said inclined positions comprises means for selectively shifting said notches toward or away from one or the other of said attachment points.

22. In a sorter as set forth in claim 21 further comprising control means responsive to indicia associated with each of said articles for identifying the one predetermined receptacle to which said article is to be delivered, said shifting means being responsive to said control means so as to preposition the carrier conveying said article to one or the other of its said inclined positions such that when the last-said carrier moves into register with the selected one unloading station the carrier body is inclined to deliver said article to said one predetermined receptacle.

23. In a sorter as set forth in claim 22 wherein said shifting means comprises an actuator cooperable with said latch means as said conveyor is moved along said conveyor downstream from said loading station for shifting said notches as relative to said carrier base.

24. In a sorter as set forth in claim 23 wherein said shifting means is cooperable with said latch means of each carrier for effecting shifting of said latch means as said carrier is conveyed past said shifting means.

25. In a sorter as set forth in claim 24 wherein said latch means comprises a slide latch member movable generally perpendicular to the direction of movement of said carrier, said shifting means comprising a fluid cylinder which is momentarily coupled with said slide latch member so as to effect sliding movement of said slide latch member relative to said carrier.

26. In a sorter as set forth in claim 25 wherein said slide latch member has an operating member and wherein said fluid cylinder unit has a coupler operatively cooperable with said operating member thereby to momentarily couple said fluid cylinder to said latch member for effecting shifting of said latch member as said conveyor moves said carriers past said fluid cylinder.

27. Method of sorting articles into a selected one of a plurality of article-receiving receptacles, said receptacles being arranged in groups along a path, with each group of receptacles constituting an unloading station, with at least one of the receptacles at each unloading station being on one side of said path and with another of said receptacles being on the other side of said path, a loading station along said path, wherein the method comprises the steps of:

positioning a carrier in a generally vertical loading position;

with said carrier in its said loading position at said loading station, loading an article into a carrier;

moving said carrier along said path away from said loading station;

prepositioning said carrier in either a first inclined position toward said one side of said path for delivery of said article into a selected one of said receptacles on one side of said path at a predetermined unloading station or a second inclined position toward said other side of said path for delivery of said article into a selected other of said receptacles on the other side of said path at said predetermined unloading station; and with said carrier in one of its said inclined positions, effecting the unloading of said article from said carrier at said predetermined unloading station along said path for delivery of said article to said selected one or said selected other of said receptacles.

28. The method as set forth in claim 27 further comprising moving said carrier from one of its inclined positions toward the inside of a turn in said path to a position at least somewhat more centered with respect to said path as said carrier moves into and through said turn thereby to prevent interference between adjacent carriers inclined toward the inside of said turn as they are conveyed through said turn.

29. The method as set forth in claim 28 further comprising effecting movement of said carrier from its said somewhat more centered position to its said one inclined position as said carrier moves from said turn.

30. The method as set forth in claim 27 wherein said path is an endless path, said method comprising conveying said carrier past said unloading stations and back to a loading station.

31. The method as set forth in claim 30 further comprising moving said carrier from either of its said inclined positions to a centered position prior to having an article loaded therein at said loading station.

32. The method as set forth in claim 27 further comprising contacting a portion of said carrier by a trip actuator at said predetermined unloading station thereby to effect the release of an article carried by a carrier at said predetermined unloading station for delivery of said article to its said selected one receptacle.

33. The method as set forth in claim 32 further comprising contacting said carrier portion by said trip actuator at a location substantially vertically coplanar with said conveyor path such that one said trip actuator is operable to effect the release of said article regardless of the inclined position of said carrier.

34. Apparatus for sorting articles into a selected one of a multiplicity of article receiving receptacles, said apparatus comprising a plurality of carriers, means for conveying said carriers together with said articles received therein along a path, a loading station along said path at which articles to be sorted are loaded into said carriers, a plurality of unloading stations along said path, each said unloading station having at least a first article-receiving receptacle and a second article-receiving receptacle, means for supporting each of said carriers on said conveying means as said carrier is conveyed along said path in a loading position in which said carrier is generally vertical at said loading station for insertion of an article into said carrier, a first predetermined position in which an article unloaded from said carrier at a selected one of said unloading stations is delivered to said first article receiving receptacle, and in a second predetermined position in which an article unloaded from said carrier at said selected one of said unloading stations is delivered to said second article receiving receptacle, means for prepositioning a selected one of said carriers in one of its said first or second predetermined positions as said selected one carrier moves along said path from said loading station to said selected one unloading station, and means at said selected one unloading station for effecting the unloading of said article from said selected one carrier thereby to deliver said article carried by said selected one carrier to a predetermined article receiving receptacle at said selected one unloading station.

35. Apparatus as set forth in claim 34 wherein said path is an endless path from said loading station past said unloading station and back to said loading station, said apparatus having means for moving said carriers from either of their said inclined positions to said generally vertical loading position as said carrier moves into said loading station.

36. Apparatus as set forth in claim 35 wherein said path has a turn, and wherein said apparatus further comprises means at said turn for moving certain of said carriers toward the center of said path as said carriers are conveyed through said turn thereby to prevent interference between the carriers as they move through the turn.

37. Apparatus as set forth in claim 36 wherein said means for moving said carriers further permits said moved carriers to return to their prepositioned inclined positions as said carriers are conveyed from said turn.

38. A method of sorting articles into a selected one of a plurality of article-receiving receptacles, said receptacles being arranged in groups along a path, with each group of receptacles constituting an unloading station, wherein the method comprises the steps of:
  positioning said carrier in a loading position in which said carrier is generally vertically disposed;
  loading an article into a carrier while the carrier is in its said loading position;
  moving said carrier along said path;
  prepositioning said carrier in either a first predetermined position for delivery of said article into a selected one of said receptacles at a predetermined unloading station or in a second predetermined position for delivery of said article into a selected other of said receptacles at said predetermined unloading station; and
  with said carrier in one of its said predetermined positions, effecting the unloading of said article from said carrier at said predetermined unloading station for delivery of said article to said selected one or said selected other of said receptacles at said predetermined unloading station.

39. The method as set forth in claim 38 wherein said step of loading said article into said carrier occurs at a loading station along said path with the carrier in said loading position, and wherein said carrier is moved form its loading position to its said first or second predetermined positions as said carrier is moved along said path from said loading station to said predetermined unloading station.

40. The method as set forth in claim 38 further comprising the step of moving said carriers from their said first or second inclined positions to said generally vertical loading position as said carriers move into said loading station.

* * * * *